(12) United States Patent
Hashemian et al.

(10) Patent No.: US 8,924,184 B2
(45) Date of Patent: Dec. 30, 2014

(54) PITOT TUBE DIAGNOSTIC SYSTEMS AND METHODS

(71) Applicant: Analysis and Measurement Services Corporation, Knoxville, TN (US)

(72) Inventors: Hashem M. Hashemian, Knoxville, TN (US); Ryan Douglas O'Hagan, Knoxville, TN (US)

(73) Assignee: Analysis and Measurement Services Corporation, Knoxville, TN (US)

( * ) Notice: Subject to any disclaimer, the term of this patent is extended or adjusted under 35 U.S.C. 154(b) by 0 days.

(21) Appl. No.: 13/899,045

(22) Filed: May 21, 2013

(65) Prior Publication Data

US 2014/0156226 A1   Jun. 5, 2014

Related U.S. Application Data

(63) Continuation-in-part of application No. 13/015,783, filed on Jan. 28, 2011, now abandoned.

(60) Provisional application No. 61/299,107, filed on Jan. 28, 2010.

(51) Int. Cl.
| | | |
|---|---|---|
| *G06F 17/18* | (2006.01) | |
| *G01P 21/02* | (2006.01) | |
| *G01F 1/46* | (2006.01) | |
| *G01P 5/16* | (2006.01) | |
| *G01F 25/00* | (2006.01) | |

(52) U.S. Cl.
CPC ............. *G06F 17/18* (2013.01); *G01P 21/025* (2013.01); *G01F 1/46* (2013.01); *G01P 5/16* (2013.01); *G01F 25/0007* (2013.01)

USPC .......................................... 702/185; 702/183

(58) Field of Classification Search
CPC ......................................................... G01F 1/46
USPC ................................................................ 702/185
See application file for complete search history.

(56) References Cited

U.S. PATENT DOCUMENTS

| | | | |
|---|---|---|---|
| 6,038,932 A | 3/2000 | Wandel et al. | |
| 6,564,628 B1 | 5/2003 | Leblond et al. | |
| 6,915,237 B2 | 7/2005 | Hashemian | |
| 7,103,507 B2 | 9/2006 | Gorinevsky et al. | |
| 7,124,630 B2 | 10/2006 | Hanson et al. | |
| 7,369,965 B2 | 5/2008 | Mylaraswamy et al. | |
| 7,379,845 B2 | 5/2008 | Gorinevsky et al. | |
| 7,509,537 B1 | 3/2009 | Jensen et al. | |
| 7,549,331 B1 | 6/2009 | Powell | |
| 2004/0176887 A1 | 9/2004 | Kent et al. | |
| 2005/0034533 A1* | 2/2005 | Wang | 73/861.05 |
| 2005/0274420 A1* | 12/2005 | Lochtefeld et al. | 137/565.33 |
| 2006/0126608 A1 | 6/2006 | Pereira et al. | |
| 2006/0259217 A1 | 11/2006 | Gorinevsky et al. | |
| 2007/0088570 A1 | 4/2007 | Shetty et al. | |
| 2007/0288409 A1 | 12/2007 | Mukherjee et al. | |
| 2008/0215194 A1 | 9/2008 | Bailly et al. | |
| 2009/0326890 A1 | 12/2009 | Shetty et al. | |

* cited by examiner

*Primary Examiner* — Bryan Bui
(74) *Attorney, Agent, or Firm* — Pitts & Lake, P.C.

(57) ABSTRACT

A pitot tube diagnostic system including a data acquisition unit to acquire an output signal of a pitot-static system, the output signal having a static component and a dynamic component, and a processing unit to monitor the dynamic component for one or more characteristics that deviate from one or more predetermined reference characteristics to indicate impairment of the pitot-static system.

20 Claims, 6 Drawing Sheets

PITOT TUBE DIAGNOSTIC SYSTEMS AND METHODS

CROSS-REFERENCE TO RELATED APPLICATIONS

This application is a continuation-in-part (CIP) of U.S. application Ser. No. 13/015,783 filed on Jan. 28, 2011, which claims the benefit of U.S. Provisional Application No. 61/299,107 filed on Jan. 28, 2010.

BACKGROUND

1. Field of Invention

The present invention relates to a diagnostic system for pitot-static systems in aircraft. More specifically, the present invention relates to a diagnostic system for in-flight and pre-flight detection of anomalies in pitot-static system readings which are indicative of the health of the pitot-static system.

2. Background of Relevant Art

Figure 1:
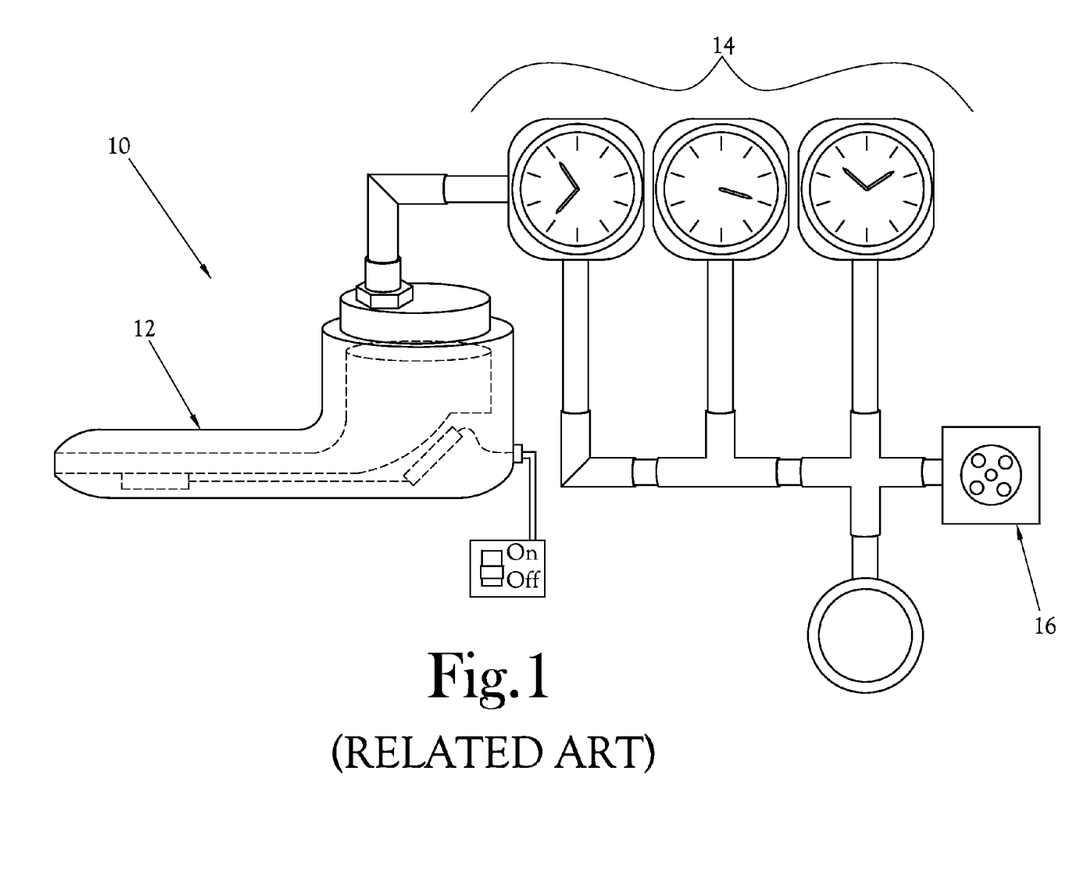
FIG. 1 is an illustration of a conventional pitot-static system used in aircraft.

The health and integrity of aircraft sensors and instruments play a critical role in aviation safety. In the case of a pitot-static system, the health and integrity of sensors and instruments are often critical to a successful flight. The pitot-static system is a pressure-sensitive system that is used to determine specific details about the aircraft's flight. FIG. 1 illustrates a conventional pitot-static system 10 that includes a pitot tube 12, pitot-static instruments 14, and a static port 16. As depicted, the pitot tube 12 and static port 16 (typically referred to as probes or air data probes) are essentially extensions of pressure sensors which provide data to the pitot-static instruments 14 to generate indications of the aircraft's airspeed, vertical speed, and altitude. These sensors/probes may experience problems with blockages, icing, and moisture which contribute to inaccurate readings in the pitot-static instruments 14. Inaccurate readings on the pitot-static instruments 14 can lead to erroneous decisions which result in serious, if not fatal, consequences.

Many aircraft crashes in recent years have been linked to failures in the pitot-static system 10. These failures may include loss of airspeed indication and airspeed anomalies that have resulted from water contamination of the pitot tube, icing, tape covering the static ports 16, and pitot tube 12 blockages. Recently, the Federal Aviation Administration has issued an order stating that all U.S. Airlines operating Airbus A330s and A340s must replace at least two of the three pitot tube 12 sensors on each plane because of the safety concerns of pitot tube 12 blockages. Accordingly, the detection of failures in the pitot tube 12 readings is of great importance to aviation safety.

BRIEF SUMMARY

Pitot tube diagnostic systems and methods for determining the health of a pitot tube are described herein. Example embodiments of the present general inventive concept can be achieved by a pitot tube diagnostic system which is temporarily connectable to or permanently installable in an airplane's pitot-static system, which allows the pitot tube diagnostic system to be utilized during pre-flight inspections and during in-flight conditions, respectfully. In some embodiments a processing algorithm can be installed in the air data computer.

Example embodiments of the present general inventive concept can be achieved by providing a pitot tube diagnostic system, including a data acquisition unit to acquire an output signal of a pitot-static system (PSS), the output signal having a static component and a dynamic component, and a processing unit to monitor the dynamic component for characteristics that exceed or deviate from a predetermined reference level to indicate impairment of the PSS. The diagnostic system can be installed to a pitot-static system of an aircraft to monitor the output signals during flight or pre-flight.

Example embodiments of the present general inventive concept can also be achieved by providing a method of diagnosing health of a pitot-static system, including directing an air input to a pitot-static system (PSS), acquiring an output signal of the PSS which is a function of the air input, the output signal including a static component and a dynamic component, and monitoring the dynamic component for one or more characteristics that deviate from one or more predetermined reference characteristic (e.g., beyond predetermined limits) to indicate impairment of the PSS.

Example embodiments of the present general inventive concept can also be achieved by a pitot tube diagnostic system including an acquisition system in communication with a processing system. The acquisition system can be configured to be placed in electrical communication with the pitot-static system for the aircraft. In some embodiments the acquisition system samples output signals from the pitot-static system and produces sampled signals. The output signals can be filtered prior to data acquisition. The output signal includes a static component and a dynamic component. The processing system receives the sampled signals from the acquisition system and monitors the dynamic (AC) component of the output signal for characteristics indicative of improper functionality of the pitot static system. The dynamic component of the output signal can be representative of process fluctuations or "noise." Anomalies in the signal and/or deviations from predetermined baseline values or traces can be used to identify impairment of the PSS. In some embodiments the pitot tube diagnostic system analyzes the dynamic component using the "noise analysis" technique, power spectral density (PSD) curves, or amplitude probability density (APD) plots. This analysis allows the pitot tube diagnostic system to determine whether there are potential problems with pitot-static system, such as problems with the instruments or sensors, blockage or damage to the pitot-static system, or the degradation of the pitot-static system.

BRIEF DESCRIPTION OF THE DRAWINGS

The above-mentioned features of the invention will become more clearly understood from the following detailed description of the invention read together with the drawings in which.

DETAILED DESCRIPTION

A pitot tube diagnostic system and method for determining the health of a pitot tube is described in detail herein and shown in the accompanying figures. The pitot tube diagnostic system is configured to be temporarily connectable to or permanently installable in an airplane's pitot-static system, which allows the pitot tube diagnostic system to be utilized during pre-flight inspections and/or in-flight conditions. The pitot tube diagnostic system is in electrical communication with the pitot-static system for acquisition of output signals and analysis thereof. Thus, the pitot-static diagnostic system is able to diagnose anomalies in the pitot-static systems that are representative of the overall health and efficiency of the pitot-static system.

Figure 2:
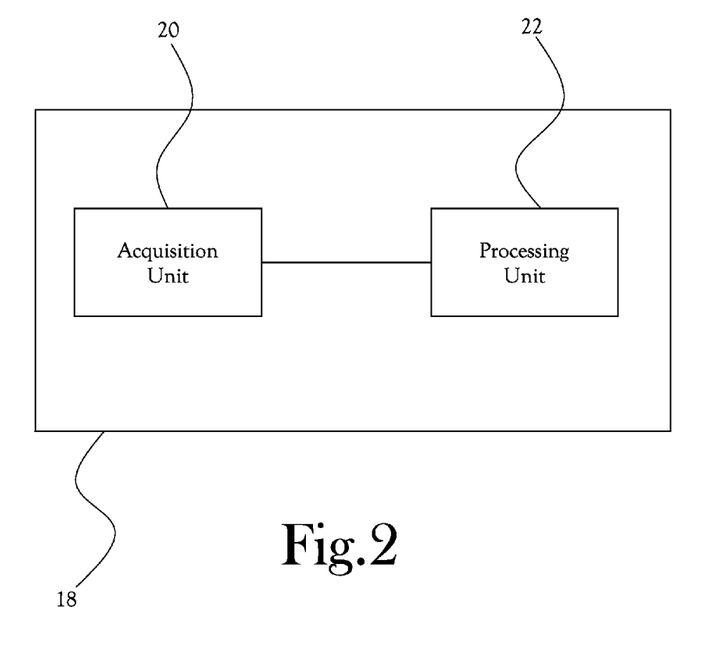
FIG. 2 is a block diagram of a pitot tube diagnostic system according to an example embodiment of the present general inventive concept.

FIG. 2 is a block diagram of a pitot tube diagnostic system according to an example embodiment of the present general inventive concept. FIG. 2 illustrates a pitot tube diagnostic system illustrated generally at 18. The pitot tube diagnostic system 18 includes an acquisition system 20 in communication with a processing system 22. The acquisition system 20 is configured to be placed in electrical communication with the pitot-static system 10 for the aircraft. The acquisition system 20 samples the output signals from the pitot-static system 10 and produces sampled signals. The processing system 22 receives the sampled signals from the acquisition system 20 and performs filtering, calculations, and analysis on the sampled signals to determine the health of the pitot-static system 10.

Figure 3:
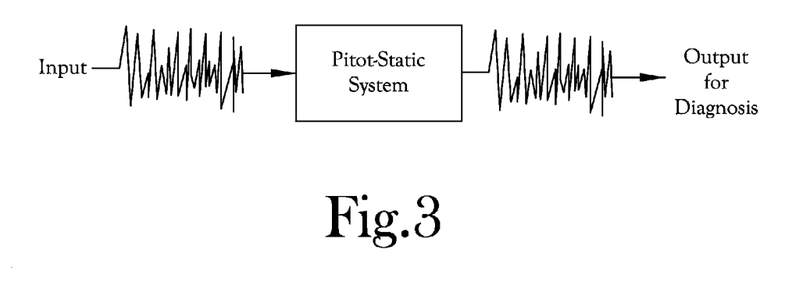
FIG. 3 is a block diagram of a pitot-static system and the respective input signal and output signal for diagnosis according to an example embodiment of the present general inventive concept.

FIG. 3 is a block diagram of a pitot-static system 10 and the respective input signal and output signal according to an example embodiment of the present general inventive concept. In the depicted embodiment, the input signal is representative of the air flow or pressure undergone by the pitot-static system 10 and the pitot-static system 10 produces an output signal responsive to the input signal. For the noise analysis technique proposed herein, the inherent fluctuations or noise from the sensor output arising from turbulence and process fluctuations are analyzed in the frequency domain. These fluctuations provide valuable indicators for failure detection when the sensor is subjected to a turbulent process. The output signal represents the sensor's response to the process fluctuations it is measuring, e.g., air flow or pressure.

Figure 4:
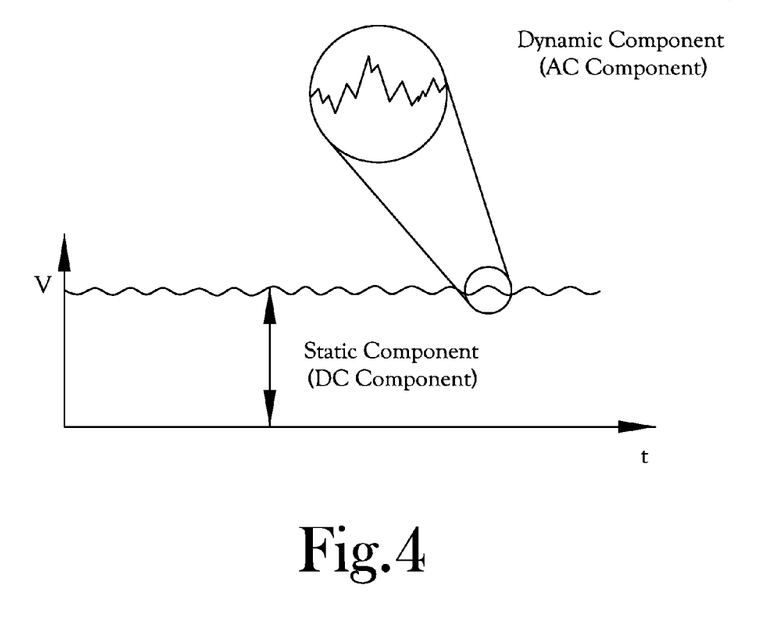
FIG. 4 is a representation of an electrical signal produced by the pitot-static system including a static component and a dynamic component according to an example embodiment of the present general inventive concept.

FIG. 4 is a representation of an electrical signal produced by the pitot-static system 10 including a static component and a dynamic component according to an example embodiment of the present general inventive concept. Specifically, the output signal of the pitot-static system 10 contains two electrical components: a static (DC) component that represents the process parameter, e.g., the total pressure, used by the pitot-static instruments 14 to provide airspeed, vertical speed or altitude, and a dynamic (AC) component that is a representation of the process fluctuations or "noise." In one embodiment, the pitot tube diagnostic system 18 samples and filters the output signal to isolate the dynamic (AC) component. The Nyquist sampling theorem determines the appropriate data acquisition requirements to properly identify a pitot-static system dynamic response using the noise analysis technique. This theorem states that one has to acquire data at a frequency two times greater than the frequency one is trying to resolve. As an example, if the dynamic component of the pitot-static system contains meaningful data about its dynamic response at 100 Hz, then a minimum data sampling frequency of 200 Hz will be needed to adequately resolve this response using noise analysis.

Figure 5:
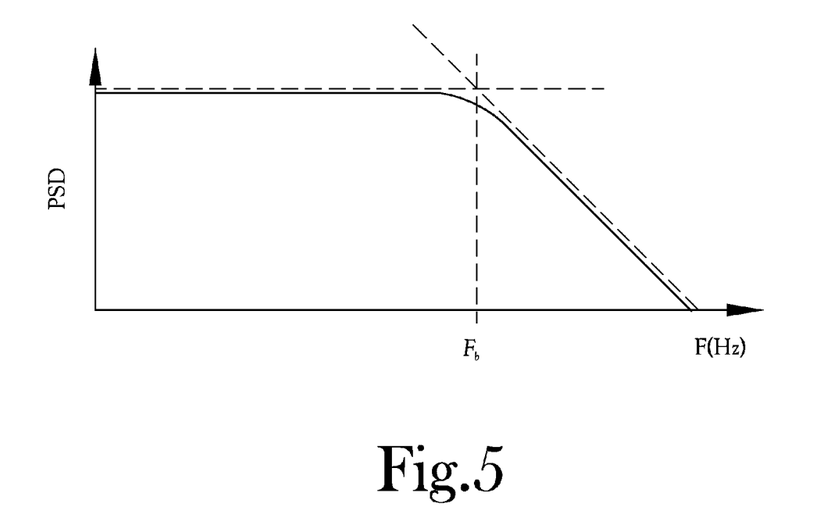
FIG. 5 is an illustration of a theoretical PSD Curve with break frequency according to an example embodiment of the present general inventive concept.

FIG. 5 is an illustration of a theoretical PSD Curve with break frequency according to an example embodiment of the present general inventive concept. The power spectral density (PSD) signature of the data can be determined for the dynamic component of the pitot-static system 10 output signals. One method used to obtain these PSD signatures is called the "noise analysis" technique. Such a method can be utilized for detecting blockages of pressure sensors, which experience significant process fluctuations (noise). For example, the fluctuations from the sensor output arising from turbulence and process fluctuations can be analyzed in the frequency domain for evaluation of the pitot-static system 10. For frequency domain analysis, the Fast Fourier Transform (FFT) has proven to provide adequate results for performance monitoring and anomaly detection involving dynamic analysis of sensor outputs. FFT calculations of the signal "noise" are used to produce a Power Spectral Density (PSD) curve. The PSD is a variance of the signal amplitude (A2) in a narrow frequency band (Hz) that is normalized to frequency (A2/Hz), and then plotted against frequency. A PSD curve is used to determine a sensor's response time measured by the inverse of the break frequency (Fb) as shown in FIG. 5. As the pitot-static system 10 becomes impaired or degraded, the PSD curve display resonances or deviations from a PSD baseline curve.

Figure 6:
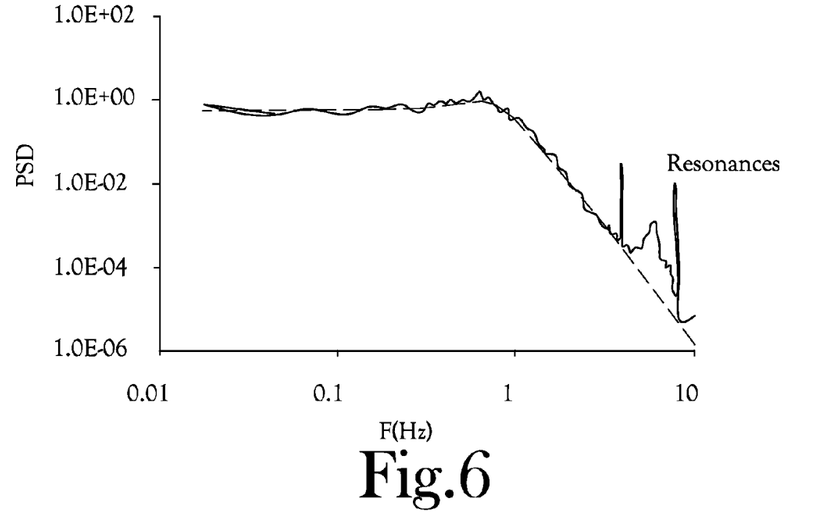
FIG. 6 is an illustration of a PSD Curve showing resonance in the signal according to an example embodiment of the present general inventive concept.

FIG. 6 is an illustration of a PSD curve showing resonance in the signal according to an example embodiment of the present general inventive concept. Typically, sensors are multi-order systems which may cause PSD curves to contain resonances.

Figure 7:
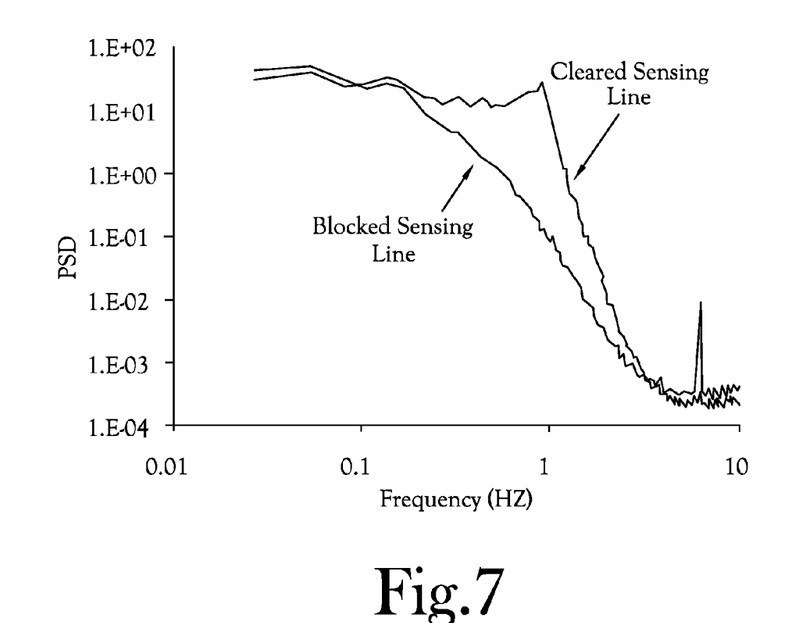
FIG. 7 is an illustration of the noise analysis results for a clear pitot tube and a blocked pitot tube according to an example embodiment of the present general inventive concept.

FIG. 7 is a representative illustration of noise analysis results for a clear pitot tube and a blocked pitot tube according to a representative example embodiment of the present general inventive concept. FIG. 7 illustrates a significant decrease in dynamic response that indicates a blockage. Additionally, degradation in dynamic response can be characterized with the use of baseline comparison.

Furthermore, in one embodiment of the pitot tube diagnostic system 18, the data is qualified for evaluation of the pitot-static system 10. Raw data from the pitot-static system 10 in many processes often contain extraneous effects and artifacts that must be removed in preparing the data for processing analysis. Data qualification techniques can be used to qualify pitot-static system 10 output for noise analysis. The raw data can be screened for linearity, normality, and the presence of erroneous data records such as spikes. In this process, the mean value of the raw signal can be identified and examined block by block, the amplitude probability density (APD) plot of the data is generated, and data qualification parameters such as variance, skewness, and kurtosis are calculated and examined. For example, when noise data is taken, the scan rate and number of points to acquire can be specified, and the number of points to acquire can be the "block size." Multiple "blocks" can then be acquired with a specified scan rate and number of points to calculate a PSD for each "block," and the blocks can be averaged together to get a cleaner, smoother PSD for analysis. In some embodiments, example noise data acquisition specs can include, but are not limited to, a scan rate of 2000 Hz, a block size of 4096 points, and number of blocks of 5, resulting in 5 blocks of approximately 2 seconds each.

Figure 8A:
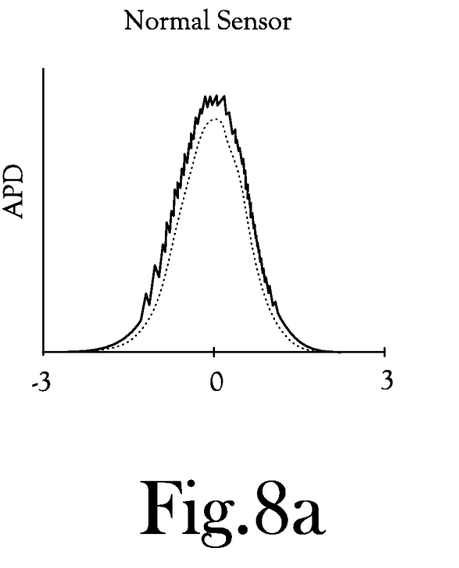
FIG. 8a is an illustration of APD plot for determining data quality and sensor performance according to an example embodiment of the present general inventive concept.
Figure 8B:
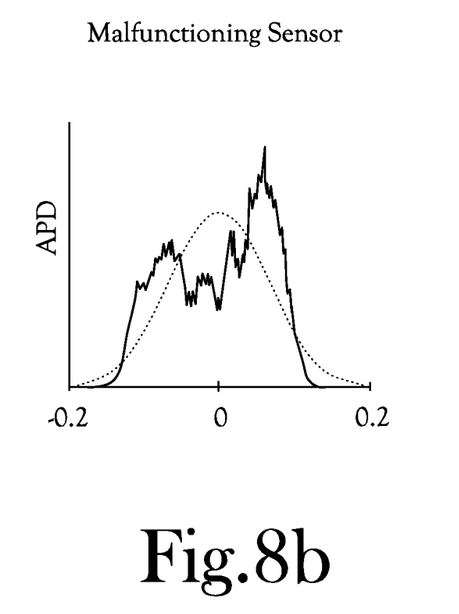
FIG. 8b is an illustration of APD plots for determining data quality and sensor performance according to an example embodiment of the present general inventive concept.

FIG. 8 illustrates two APD plots for a normal and an anomalous data record, namely FIGS. 8a and 8b, respectively. Specifically, FIGS. 8a and 8b are illustrations of APD plots for determining data quality and sensor performance according to an example embodiment of the present general inventive concept. These APD plots are used for detection of anomalies and for determining problems in the data itself. For a baseline reference, a Gaussian distribution function (the dashed bell-shaped curve) is also shown in FIGS. 8a and 8b. The illustrated Gaussian distribution curve provides the basis for determining the normality and linearity of the measured signal. The degree of abnormality of the data can be calculated by subtracting the APD from the corresponding Gaussian distribution.

In alternate embodiments, the pitot tube diagnostic system 18 can perform noise analysis on the data using other plotting and/or mathematical tools. For example, in one embodiment, the pitot tube diagnostic system 18 evaluates the dynamic component using Auto Regressive (AR) modeling. AR modeling allows the pitot tube diagnostic system to perform diagnostics autonomously. For example, the AR technique can be programmed to perform its function automatically using a computer. This is in contrast with PSD analysis which typically requires the analyst to look at the PSD plot and make a judgment. In another embodiment, the pitot tube diagnostic system 18 evaluates for blockages by performing zero-cross calculations on the dynamic component. Zero-cross calculations allow the pitot tube diagnostic system 18 to monitor the number of times the dynamic component crosses an average value per unit of time. When the dynamic component is isolated from the sampled signal, the average value is zero because the static signal, or the DC bias, is removed such that the dynamic component fluctuates around zero. It is also noted that pitot tube diagnostics, such as diagnostics of a blockage, can benefit from the calculation of skewness, kurtosis, and higher moments of the dynamic component.

Figure 9:
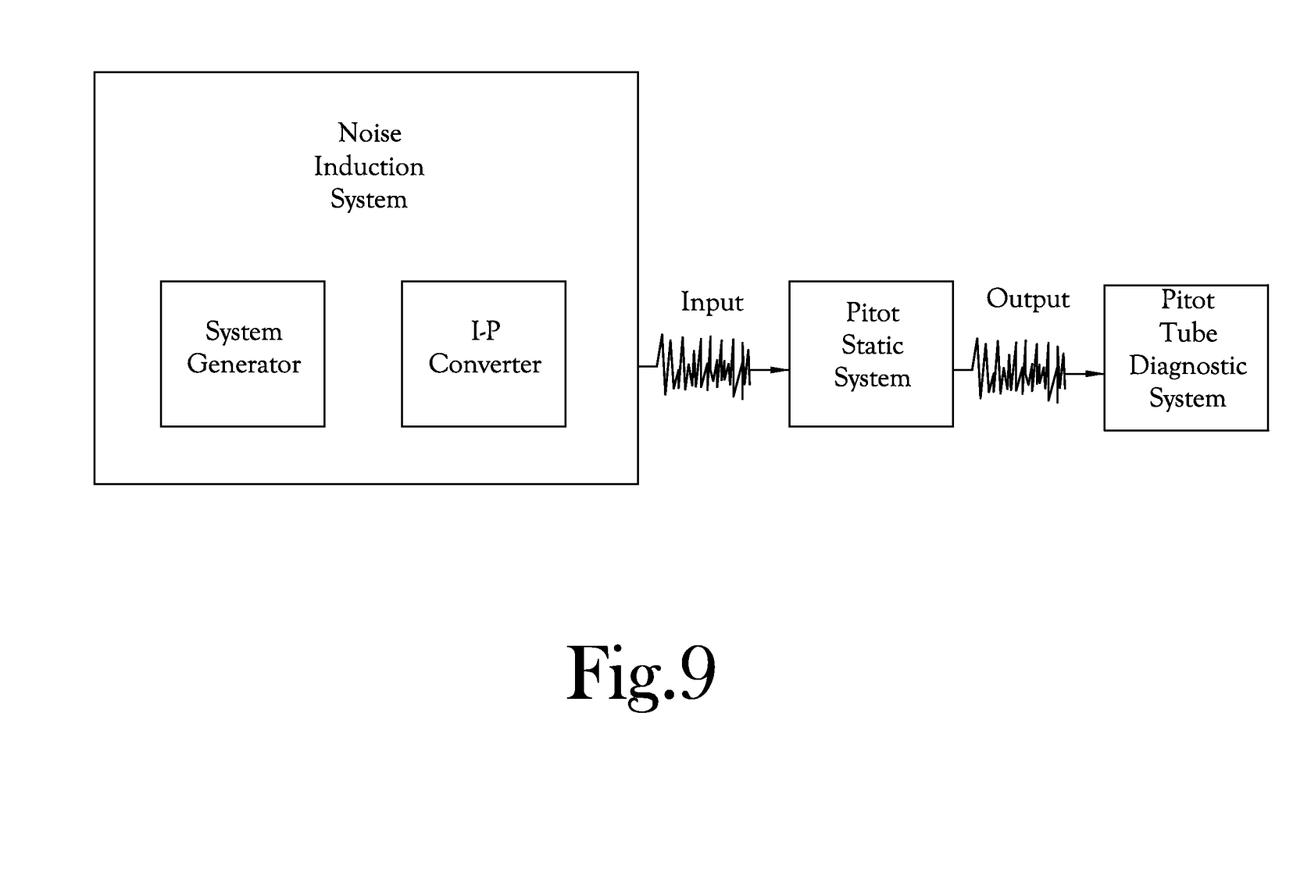
FIG. 9 is a block diagram of one embodiment of a system for performing pre-flight testing of pitot tubes according to an example embodiment of the present general inventive concept.

FIG. 9 is a block diagram of one embodiment of a system for performing pre-flight testing of pitot tubes according to an example embodiment of the present general inventive concept. Specifically, pre-flight testing allows the pitot tube diagnostic system 18 to diagnose the health of the instruments by detection of anomalies in pitot-static system 10. A fundamental premise of noise analysis is that the sensor, under test, will experience wideband process fluctuations to produce sufficient output for the technique. When an aircraft is in flight, pitot tubes should experience adequate high frequency fluctuations as a result of air speed, turbulence, etc. However, in pre-flight checks, the pitot tubes reside in mild conditions. Diagnosing pitot-static system 10 anomalies in pre-flight conditions requires inducing an input on the pitot-static system 10 and analyzing the resultant output using the same noise analysis technique. Referring to FIG. 9, the noise induction system uses a current to pressure (I-to-P) converter and a random signal generator. The signal generator provides the electrical signal that drives the I-to-P converter to produce a random pressure signal which is directed to the pitot tube under test. This approach simulates the airflow input to the pitot sensor that is used for the noise analysis technique. This noise induction method provides the benefit of diagnosing any issues in the pitot tube prior to takeoff to avoid costly delays.

From the forgoing description, it will thus be evident that the pitot tube diagnostic system 18 offers advantages for the detection of anomalies such as blockage, icing or moisture in aircraft pitot-static systems 10. The pitot tube diagnostic system 18 does not add significant weight or cost to current aircraft designs and can be implemented quickly and safely. Additionally, through the implementation of on-line monitoring for pitot tube blockage, flight delays due to instrumentation error as well as in-flight uncertainty and confusion could be reduced resulting in significant cost savings and improved reliability. Ultimately, the pitot tube diagnostic system 18 benefits the aviation industry, protects the public from aviation mishaps, and responds to current and long-term needs in the area of instrumentation failure detection, condition monitoring, and autonomous detection of anomalies for aircraft.

Example embodiments include a pitot tube diagnostic system comprising: a pitot-static system (PSS) adapted to provide a PSS output indicative of flight conditions; a processing system adapted to: receive the PSS output; derive a processing signal which is a function of the PSS output, the processing signal having a static component and a dynamic component; and monitor the dynamic component for characteristics indicative of improper functionality of the PSS. The pitot tube diagnostic system processing system monitors by analyzing for anomalies that indicate the PSS is impaired, degraded, or blocked. The pitot tube diagnostic system monitors the dynamic component over time by calculating a power spectral density curve for the dynamic component and monitoring the power spectral density curve against a dynamic component baseline curve. The power spectral density can be used to represent the dynamic component in the frequency domain, and the power spectral density can be monitored for changes in the dynamic component. The pitot tube diagnostic system calculates an amplitude probability density plot for the dynamic component and monitors the amplitude probability density plot against a Gaussian distribution curve to measure the degree of abnormality of the dynamic component. The pitot tube diagnostic system monitors for blockages by calculation of skewness, kurtosis, and higher moments of the dynamic component. The pitot tube diagnostic system of claim 1 wherein the processing system monitors the dynamic component by Auto Regressive (AR) modeling allowing the pitot tube diagnostic system to perform diagnostics autonomously without user interpretation. The pitot tube diagnostic system of claim 1 wherein the dynamic component is monitored using zero-cross calculations performed by the processing system to monitor the number of times the dynamic component crosses an average value per unit of time. The pitot tube diagnostic system may include a signal conditioning unit which applies a high-pass filter to the sampled output signals to obtain the dynamic component in the sampled output signals. In some embodiments the processing system can qualify the sampled output signals by screening the sampled output signals for linearity, normality, and the presence of erroneous data records by identifying and examining a mean value of a predetermined number of blocks of the output signals against a baseline value, but the present general inventive concept is not limited thereto. In some embodiments the processing system can qualify the sampled output signals by screening the sampled output signals for linearity, normality, and the presence of erroneous data records by generating an amplitude probability density plot and calculating and examining the data qualification parameters including variance, skewness, and kurtosis to determine the degree of abnormality of the dynamic component, but the present general inventive concept is not limited thereto.

While the present general inventive concept has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The general inventive concept in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A pitot tube diagnostic system, comprising:
   a data acquisition unit to acquire an electrical output signal of from a pitot-static system (PSS), the data acquisition unit being in electrical communication with the PSS, the output signal having a static component and a dynamic component; and
   a processing unit to monitor fluctuations of the dynamic component and to compare the fluctuations against a predetermined baseline level to identify fluctuations that deviate from the predetermined baseline level by a predetermined value to indicate impairment of the PSS.

2. The pitot tube diagnostic system of claim 1, further comprising a signal conditioning unit to filter the output signal, wherein the data acquisition unit samples filtered output signals to enable the processing unit to analyze the dynamic component for anomalies that indicate the PSS is at least partially blocked.

3. The pitot tube diagnostic system of claim 1, wherein the processing unit monitors the dynamic component over time by calculating a power spectral density curve for the dynamic component and monitoring the power spectral density curve against a baseline curve to identify a change in the dynamic component over time.

4. The pitot tube diagnostic system of claim 1, wherein the processing unit calculates an amplitude probability density plot for the dynamic component and monitors the amplitude probability density plot against a Gaussian distribution curve to measure a degree of abnormality of the dynamic component.

5. The pitot tube diagnostic system of claim 2, wherein the processing unit monitors for blockages by calculation of skewness, kurtosis, and higher moments of the dynamic component.

6. The pitot tube diagnostic system of claim 1, wherein the processing unit monitors the dynamic component by Auto Regressive (AR) modeling allowing the pitot tube diagnostic system to perform diagnostics autonomously without user interpretation.

7. The pitot tube diagnostic system of claim 1, wherein the dynamic component is monitored using zero-cross calculations performed by the processing system to monitor the number of times the dynamic component crosses an average value per unit of time.

8. The pitot tube diagnostic system of claim 2, wherein the signal conditioner applies a high-pass filter to the output signals to isolate the dynamic component from the static component.

9. The pitot tube diagnostic system of claim 1, wherein the processing system qualifies the sampled output signals by screening the sampled output signals for linearity, normality, and the presence of erroneous data records by identifying and examining a mean value of a predetermined number of blocks of the output signals of the pitot-static system against a baseline value to identify outliers.

10. The pitot tube diagnostic system of claim 1, wherein the processing system qualifies the sampled output signals by screening the sampled output signals for linearity, normality, and the presence of erroneous data records by generating an amplitude probability density plot and calculating and examining the data qualification parameters including variance, skewness, and kurtosis to determine a degree of abnormality of the dynamic component.

11. A method of diagnosing health of a pitot-static system, comprising: directing an air input to a pitot-static system (PSS);
    acquiring an electrical output signal of the PSS which is a function of the air input, the output signal including a static component and a dynamic component;
    monitoring the dynamic component for fluctuations; and
    comparing the fluctuations against a predetermined baseline level to identify fluctuations that deviate from the predetermined baseline level by a predetermined value to indicate impairment of the PSS.

12. The method of claim 11, wherein the operation of monitoring the dynamic component includes determining whether the pitot-static system is impaired, degraded, or blocked.

13. The method of claim 11, wherein the operation of monitoring the dynamic component includes:
    calculating a power spectral density curve for the dynamic component; and
    evaluating the power spectral density curve for deviations from a baseline curve baseline curve to identify a change in the dynamic component over time.

14. The method of claim 13, further including the operation of:
    performing a fast Fourier transform on the dynamic component to produce the power spectral density curve representing response time for the dynamic component.

15. The method of claim 13, wherein the operation of monitoring the dynamic component further includes monitoring the power spectral density curve for deviations from a baseline comparison that is indicative of blockage.

16. The method of claim 11, wherein the operation of monitoring the dynamic component further includes:
    calculating an amplitude probability density plot for the dynamic component; and
    evaluating the amplitude probability density plot against a Gaussian distribution curve to measure the degree of abnormality of the dynamic component.

17. The method of claim 11, wherein the operation of monitoring the dynamic component further includes:
    calculating of skewness, kurtosis, and higher moments of the dynamic component.

18. The method of claim 11, wherein the operation of monitoring the dynamic component further includes:
    monitoring the dynamic component by Auto Regressive (AR) modeling.

19. The method of claim 11, wherein the operation of monitoring the dynamic component further includes:
    using zero-cross calculations to monitor the number of times the dynamic component crosses an average value per unit of time.

20. A pitot tube diagnostic system installed to a pitot-static system of an aircraft comprising:
    a data acquisition unit to acquire an output signal of a pitot-static system (PSS) during flight of the aircraft, the data acquisition unit being in electrical communication with the PSS, the output signal having a static component and a dynamic component; and a processing unit to monitor fluctuations of the dynamic component and to compare the fluctuations against a predetermined baseline level to identify fluctuations that deviate from the predetermined baseline level by a predetermined value to indicate impairment of the PSS.

* * * * *

UNITED STATES PATENT AND TRADEMARK OFFICE
CERTIFICATE OF CORRECTION

PATENT NO.        : 8,924,184 B2                                Page 1 of 1
APPLICATION NO.   : 13/899045
DATED             : December 30, 2014
INVENTOR(S)       : Hashemian et al.

It is certified that error appears in the above-identified patent and that said Letters Patent is hereby corrected as shown below:

In the Claims

Claim 1, column 7, lines 18-19. The phrase "an electrical output signal of from a pitot-static system" should read "an electrical output signal from a pitot-static system".

Signed and Sealed this
Fourteenth Day of July, 2015

Michelle K. Lee
*Director of the United States Patent and Trademark Office*